Aug. 25, 1936.  H. D. STUCK ET AL  2,052,197

STAGGERED RIVETED JORDAN LINING

Filed June 6, 1934  3 Sheets-Sheet 1

INVENTORS
Philip A. Lee Hanet
Harold D. Stuck
by Gardner D. Kearns
ATTORNEY

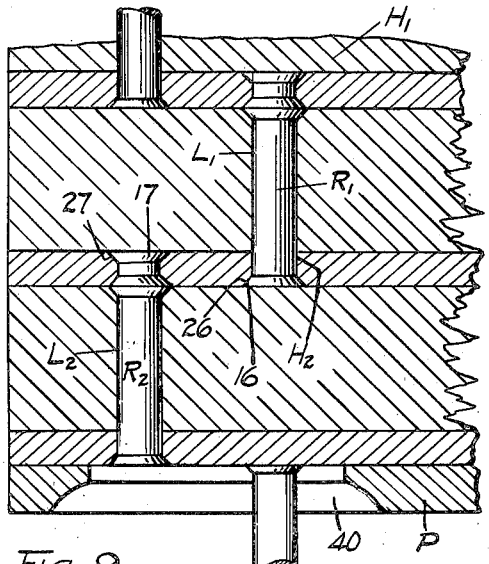
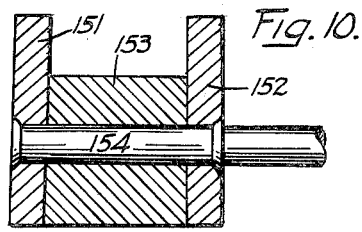
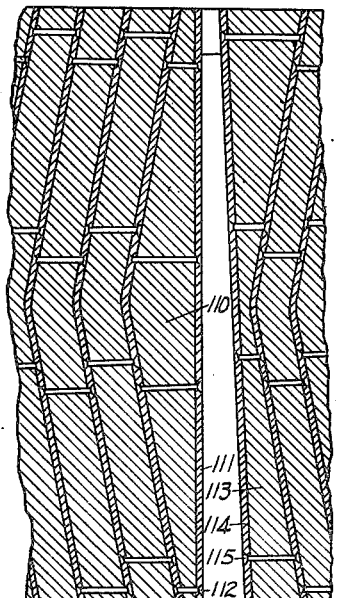
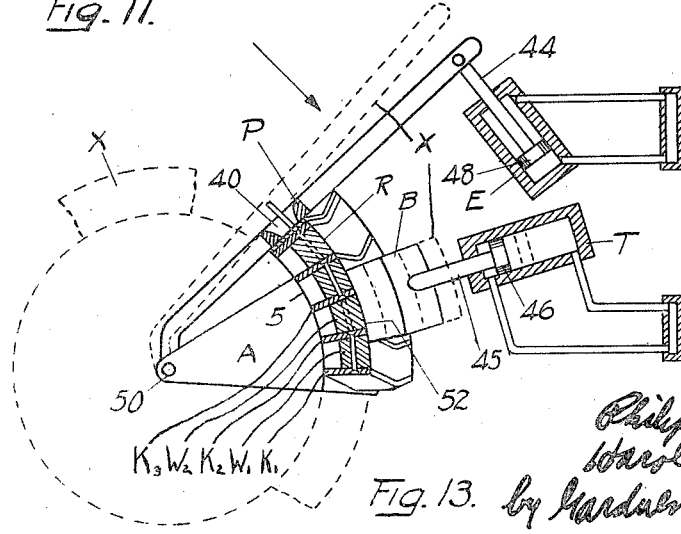
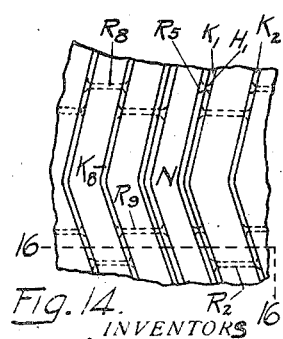

Aug. 25, 1936.  H. D. STUCK ET AL  2,052,197
STAGGERED RIVETED JORDAN LINING
Filed June 6, 1934  3 Sheets-Sheet 3

INVENTORS

Patented Aug. 25, 1936

2,052,197

UNITED STATES PATENT OFFICE 2,052,197

STAGGERED RIVETED JORDAN LINING

Harold D. Stuck, Lawrence, and Philip A. De Nault, North Andover, Mass., assignors to John W. Bolton & Sons, Inc., Lawrence, Mass., a corporation of Massachusetts Application June 6, 1934, Serial No. 729,192

10 Claims. (Cl. 92—27)

This invention relates to the filling or linings of Jordan engines.

A Jordan engine includes a frustro-conical shell on the inside of which is a filling formed of knives or knife edges which project radially inward and a plug of frustro-conical shape which has knives or bars projecting outward radially and which revolves inside the shell.

Formerly these shell fillings were built up in the shell itself by putting in position alternately knives and wooden separators, cheek pieces and holding bars and tightening the knives and separators together by the action of wedges driven in from the large end. More recently, however, all metal fillings such as described in his Patent No. 946,752 by Bahr have been used and fillings in which the knives and separators had holes and were strung on and held in position by wires or rods which passed through these holes, as see Abbe No. 235,844. Another type is such as shown in patent to Bolton No. 1,642,327 in which the knives and separators are held together by a thin metal jacket and still another type like patent to Martindale No. 1,494,265 where the knives and separators are held together by wires and babbitt.

These fillings have been formed in gangs of one-eighth, one-quarter or one-half circle and have also been made in complete circles of 360° but more often as a complete 360° filling, but with a longitudinal slot to permit the lining to be inserted in the shell and then expanded by means of a wedge driven into the slot.

A large proportion of fillings, whether of the old unassembled type or the later preconstructed type, use wooden separators between the knives and the well known swelling of wood in water has been utilized to help hold the filling firmly in place and against rotation. The swelling of the wood, especially when confined circumferentially, pushes out radially against the inside of the shell and helps to prevent the filling from revolving with the plug.

In making a preconstructed or preassembled filling, it has been found desirable, if not necessary, to provide a mould or jig, corresponding in size with the inside surface of the shell to be fitted, and to use this as a mould for a cast filling or as a jig or form for assembling the knives and separators of a compound filling. The axis of a Jordan shell in place is horizontal and it is much easier to work with a mould or jig or form having a vertical axis.

In assembling the knives and woods of a preconstructed filling in a jig or form, it has been the universal custom to place in position, either around the whole circumference or with the ends resting against stops, a substantial number of knives and separators ending with oppositely disposed cheek pieces with adjoining straight faces, and then to drive in a fitting wedge between these faces so as to force the parts together, to fill voids and to make a close circumferential fit.

These wedges may be merely temporary and the process may be repeated several times to get the required tightness.

The parts may be held in place as described above by being strung on wires or by babbitt or in a jacket or they may be held at the ends.

These wedges are generally driven in by powerful sledge hammers or bars by repeated blows and it is obvious that the surfaces along which the wedge must pass must be free from any sort of obstructions such as bolts, nuts or anything of that kind and it is also obvious that when a wedge is started, the pressure is almost entirely at the large end of the assembly, being gradually transmitted to the small end as the wedge is driven in.

It is also obvious that there is great loss of pressure power from blows, between the wedge and the cheek pieces and that the heavy pounding, necessary in driving in a wedge, is objectionable because it may displace the parts and may also damage and preclude the use of certain types of separators.

This particular invention has to do with a new method of holding the preassembled knives and separators in position so that the preassembled filling can be shipped freely without danger of injury and can be made accurately to the desired size and will keep its shape and size even if subjected to unusual heat or dryness during the shipping.

Briefly this invention consists of locking the knives together by rivets which pass through the intervening separators, the preferable arrangement being to stagger the rivets in such a way that the first set of rivets will pass from knife 1 through separator 1 into and through knife 2 where they are headed, while the second set of rivets pass through alternate holes in knife 2 and extend out and through the next separator and through holes in knife 3 where they are headed, another set of staggered rivets extending from knife 3 etc. However, the knives and separators may be arranged in groups such as for instance #1 group with five knives alternating with four separators and long rivets which pass through all of the knives and separators and are headed to hold them together there being another row of rivets projecting from the last knife to hold together a second group of a similar type.

It is obvious that with this alternate or overlapping riveted construction, the sets of rivets or nuts or bolts must be staggered and that they must be assembled successively.

Instead of what are generally called rivets, bolts may be used and in some cases welding may take the place of the usual rivet head which is spread or formed by hammering.

While it is possible they might be assembled by means of wedges, we prefer to use some sort of special machine in which great pressure, preferably of the hydraulic type, can be applied successively as the filling is built up and in such a way that the knives and separators can be squeezed together on the rivets and then the rivets can be headed over to lock two or more metal knives permanently together with one or more separators between.

By applying great pressure, which may be of the hydraulic type, along substantially the entire length of successive assemblies of knives and separators not only are the voids filled more thoroughly but an almost perfect fit for the shell can be made so that the preassembled filling can be slipped in place as a unit even without a wedge or if a slot is left for a wedge, the wedging to fit the shell is very slight. When and if the filling closely fits the shell, whether it is wedged in place or not wedged in place, if wooden separators are used and are so arranged that their outside faces come in contact with the shell, they will swell radially when soaked and serve as a powerful brake to stop the lining from turning with the plug.

However, if carefully machined parts are used, or if the separators are made of a material, like wood, which swells when wet, the squeezing pressure may be so slight that the parts can be pressed together by the hands.

If separators of metal, certain hard, compact woods or other similar firm, hard, unyielding material are carefully and accurately made to fit the knives, the shell filling can be assembled wholly by hand.

In the drawings, Fig. 1 is an isometric diagrammatic view of a Jordan shell with a split lining such as described herein partly inserted in the shell and with a wedge partly inserted in the split of the shell.

Fig. 9 is a sectional view on line 9—9 of Fig. 8 and Fig. 10 is a view similar to Fig. 4 showing a construction in which the rivets have no skirt, but are headed at both ends.

Fig. 11 is a sectional view similar to Fig. 9 showing a construction in which groups are made of four knives and three separators held together by long rivets.

Fig. 12 is a sectional view showing how the cheek pieces may be attached on each side of the split and with a wedge driven part way into the split.

Fig. 13 is a diagrammatic plan view showing one type of machine which can be used in assembling a lining such as described herein.

Fig. 14 is a view similar to Fig. 12 showing how the ends of a complete filling of three hundred and sixty degrees can be united.

This is a successive process and for convenience the knives and separators as well as the rivets, as far as possible, will be designated by letters associated with numbers 1, 2, 3, etc. to indicate the relative position of the various parts as the Jordan filling lining section is built up.

Pressure by means of wedges which extend axially, lengthwise or in the usual direction in Jordan filling probably cannot be used on account of the projecting rivets, but pressure can be applied preferably in the machine described in co-pending application for process and machine, or in the machine described herein, or it might be applied by means of transverse or radial wedges or in fact in any other way.

Preferably, the pressure, if any, along the length of each knife and each separator should be applied at right angles between the rivets and rivet holes either at the same time along substantially the entire length of a member, but it may be applied successively or only hand pressure need be used.

$K^1$ represents the first or starting knife which is of the usual bent or angular type and is the same as the other knives except that one set of rivet holes may be omitted or may not be used. As shown, each knife has two sets of rivet holes indicated by $H^1$ and $H^2$.

Figure 1:
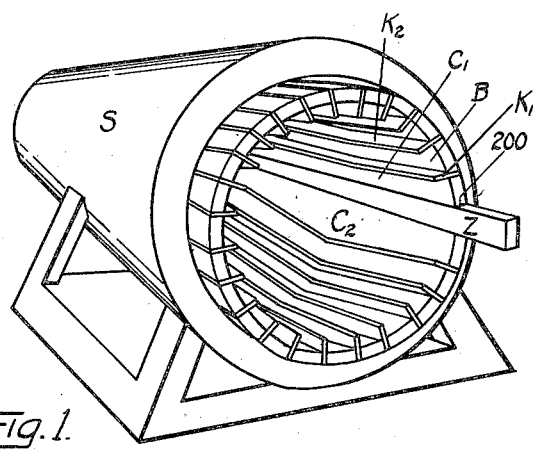
Figure 2:
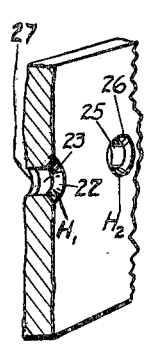
Fig. 2 is an isometric view of a broken section of a knife showing the construction of the rivet holes.
Figure 3:
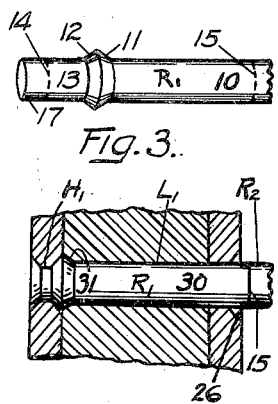
Fig. 3 is an isometric view showing part of one end of a rivet with a skirt.
Figure 4:
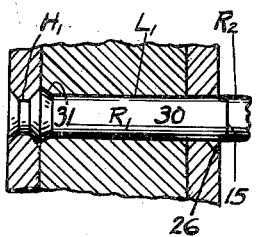
Fig. 4 is a sectional view through a first knife, a first separator and a second knife with one rivet passing through the various holes with an end projecting, as it is before the end is headed over.
Figure 5:
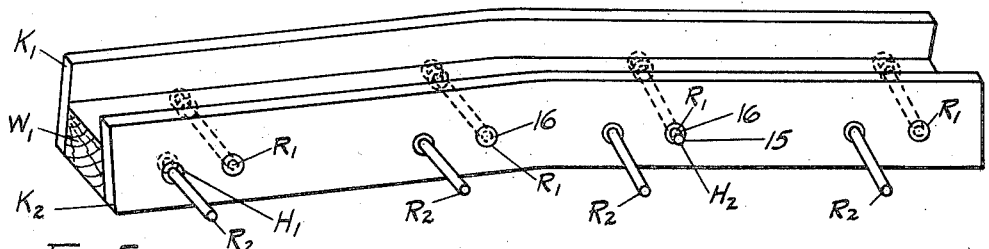
Fig. 5 is an isometric view of a first knife and a second knife with a first separator between them with a second set of rivets projecting from the second knife and some of the first set of rivets headed and some not headed.
Figure 6:
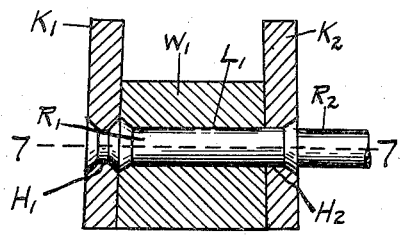
Fig. 6 is a view similar to Fig. 4 after a rivet has been headed.
Figure 7:
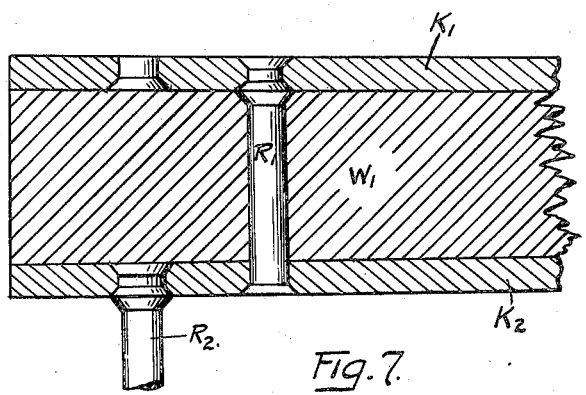
Fig. 7 is a section on the line 7—7 of Fig. 6, the rivets and holes showing in full lines.
Figure 8:
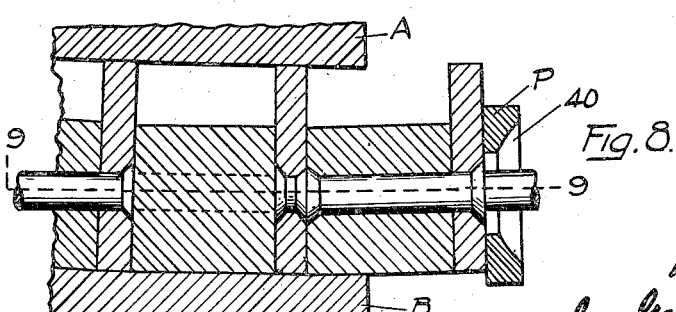
Fig. 8 is a sectional view similar to Fig. 6 showing a plurality of knives and separators with a plurality of rivets, some headed and some not headed, with a pressure plate in position to squeeze the parts together.

In Fig. 1, S represents a Jordan shell, B a filling such as described herein with a split 200 into which a wedge Z is partly driven. As shown in Fig. 1, the edges of this split are made straight instead of angular by cheek pieces $C^1$, $C^2$ each fastened to an adjoining knife by rivets.

In the preferred construction, the holes $H^1$ and $H^2$ are in line and down toward the base or outside of the knife so that they will register with similar holes such as indicated at $L^1$ or $L^2$ through the adjoining separator. Preferably each hole $H^1$ has a cylindrical part 23 each side being chamfered at 22 and 27 while each hole H² has a cylindrical part 25 only one side being chamfered at 26.

Each separator hole such as L¹ has a straight cylindrical part 30 and a chamfered part 31 and each rivet such as R¹ has a straight cylindrical part 10 which fits snugly in hole 30 and has a skirt which flares at 11 to fit chamfer 31 and contracts at 12 to fit the chamfer 22 and again is cylindrical at 13 to fit 23 and is headed over at 17 to fit the chamfer 27. At the other end, the part 10 fits the part 25 of hole H² in knife K² and is headed over at 16 to fit the chamfer 26.

It will be observed that the skirt and head on each rivet holds and registers in a knife such as K¹ and that the other head such as 16 locks a separator such as W¹ between two knives K¹ and K².

When starting, the four rivets R¹, R¹, R¹, R¹ are fastened to and stick out from knife K¹ and over these rivets is positioned the first separator W¹ and then beyond this a second knife K², from which project another set of rivets R², is positioned.

Before the first set of rivets R¹ are headed over at 16, pressure is applied to squeeze K¹ and K² together with W¹ between them, this pressure being applied between the sets of rivet holes, as shown.

In fixing each set of rivets by means of its skirt 11, 12, the end 13 may be cut off at 14 so that the head 17 will just fill the chamfer 27 and in the same way in assembling it may be desirable to have the other end 10 longer than necessary so that after pressure is applied to squeeze K¹, K² and W¹ together, each rivet such as R¹ can be cut off as at 15 so that when headed over as at 16, it will just fill the chamfer 26.

It will be understood that usually the knives are the same thickness from top to bottom, but the separators are of keystone shape which means that their inside width is less than their outside width so that as the asembly is built up it assumes a predetermined circular form or rather follows the contour of a truncated cone so that a complete assembly such as B in Fig. 1 can be introduced into the Jordan shell such as S and can be expanded therein as by means of a wedge Z, there being left a lengthwise slot for the wedge between the cheek pieces indicated by C¹ and C².

Of course, the knives might be of keystone cross section and the separators rectangular or in fact each might be of any other suitable shape.

As shown in Fig. 11, instead of using groups of two knives and one separator, one of the outside knives of each group serving as an outside member of a second group, we can use groups of four knives with three separators held together by long rivets such as 61 and 62 which pass through the intermediate knives as well as the separators and lock together the outside knives of the alternating groups.

It will be observed that each outside knife of each group serves as an outside knife of two groups.

It is obvious also that a substantially complete section or segment of a Jordan filling with only a cheek piece and a wedge slot for cheek pieces and a wedge such as shown at B in Fig. 1 can be built up or the process can stop at any desired point. In this way, segments of 180°, 90° or any other size can be built and if desired, compound cheek pieces can be riveted onto the adjoining knives, as shown at C³ and C⁴ in Fig. 12. As there shown, the compound cheek piece C³ is made up of a wooden member 110 faced with a strip of metal 111, these being held to the adjoining knife by rivets, such as 112, and compound cheek piece C⁴ is made up of a wooden part 113 faced with a metal strip 114, the whole being fastened to the next adjoining knife as by a rivet 115.

It is equally obvious that a number of such segmental linings, as for instance four, with cheek pieces on each side can be used in place of the single knives and separators now assembled in the shell in the paper mill or in place of complete or substantially complete annular sections, such as shown in Fig. 1.

Figure 15:
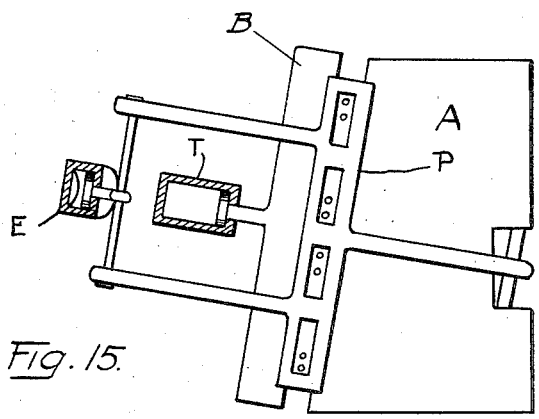
Fig. 15 is a diagrammatic elevation showing part of a machine for assembling a lining such as described.

In Figs. 13 and 15, we show one type of machine by which this filling can be assembled.

A represents a fixed jaw or base having preferably a curved face 5 which corresponds with the surface of a truncated conical segment which might be formed by the inner faces of the knives of a Jordan shell filling.

B represents a movable jaw whose inner face 52 corresponds with the inner face of a Jordan shell or the outer face of the filling for such a shell. Jaw B can be moved in and out towards jaw A by means of a piston rod 45 carried by a piston 46 in a cylinder T which may be operated by hydraulic pressure or in any other way. In fact, pressure can be applied to jaw B in any known way.

The purpose of jaws A and B is to clamp a single knife K¹ or an assembly such as K¹, W¹ and K² or K¹, W¹, K², W², K³ firmly in place so that the separators and knives when slipped over the rivets can be squeezed up against them as by a pressure plate P, shown as pivoted to jaw A at 50.

Plate P is provided with passages such as 40 which coincide with the position of the rivets R¹, R² and their respective holes and is operated by means of a piston rod 44 carried by a piston 48 working in a cylinder E. Preferably these cylinders E and T are of the double action type so that the jaw B can be positively advanced and retracted and so that the power plate P can be positively moved back and forth at will.

As the knives and woods are assembled, squeezed and locked in position they are moved along between jaws A and B as shown by the dotted lines at X and separators and knives are added, squeezed on, the rivets cut if necessary and headed so that the process is continuous.

As shown in Fig. 10, the skirt or collar such as 11, 12 of the rivets may be omitted and the knives 151 and 152 may be held together with the separator 153 between them by rivets such as 154 which are merely headed at each end.

Figure 17:
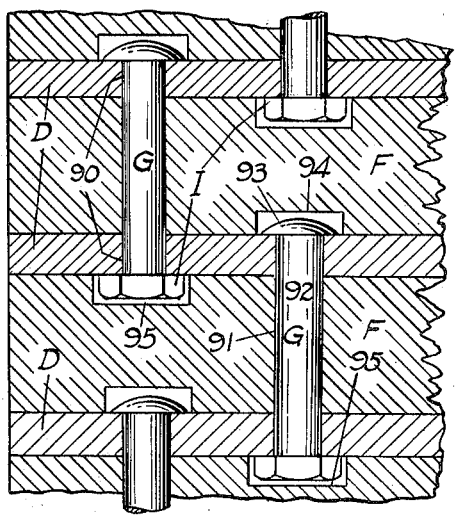
Fig. 17 is a view similar to Fig. 9 showing bolts used in place of rivets.

As shown in Fig. 17, knives such as D, D with cylindrical holes such as 90 with no chamfering and no counter-boring can be used and two knives such as D, D with a separator such as F between them can be bolted together by means of bolts such as G. These bolts G are shown as having heads 93 which are set into recesses such as 94 in an adjoining separator and as having a shank 92 of cylindrical shape which passes through a cylindrical hole at 91 in a separator F, the parts being held together by nuts such as I also located in recesses such as 95 in separator F.

With such an arrangement, if the parts are carefully machined or if the separators are of hard, compact material, the squeezing by a machine such as shown in Figs. 13 and 14 can be omitted, the nuts I, I being simply turned by hand thus squeezing the parts together after which they hold the parts together.

On the other hand, if the parts are not too hard and rigid, the assembled lining section can be forced into a mould so that the rivets or rods, which may be of soft or pliable metal, will bend slightly and stay bent, or the wood of the separators may be shaped to some extent and will stay shaped.

Figure 18:
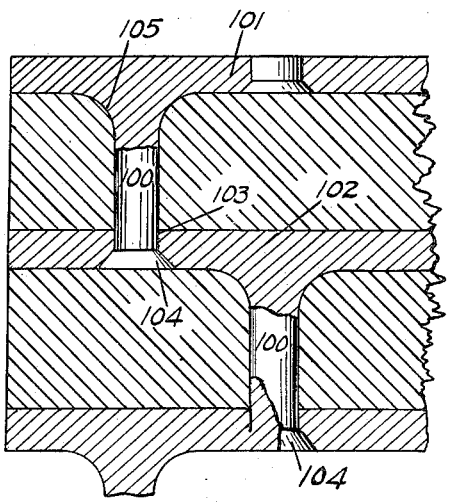
Fig. 18 is a view similar to Fig. 9 showing a construction in which one end of a connecting rod is welded to the side of a knife and the other end is passed through a hole in another knife and either headed or welded in place.

It is also obvious that rods such as 100, shown in Fig. 18, might be used instead of double headed rivets and it is obvious that one end 105 of these could be welded to the first knife 101 and the other end pushed through a hole 103 in another or second knife 102 and headed at 104 on the outside of the second knife and so on.

Figure 20:
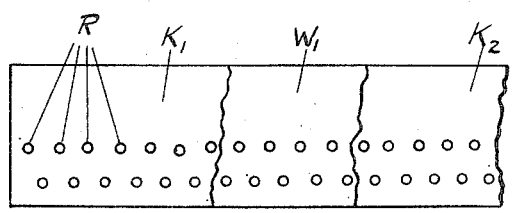
Fig. 20 is an elevation partly broken away to show two knives with a separator between them and with the rivets and rivet holes in two lines and staggered.

If great strength is required, we can use two or more rows of rivets, staggered or otherwise, with all the rivets close together, as shown in Fig. 20, and instead of riveting, we may weld some or all of the rods such as 100 to the knives at both ends. By inserting the tie rods into holes, the parts can be squeezed together and locked as they could not be if the ends of the rods merely abutted on the knives.

Figure 16:
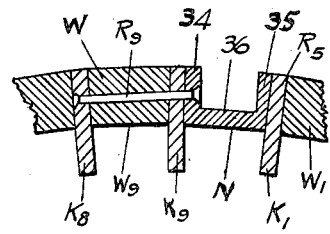
Fig. 16 is a sectional view on line 16—16 of Fig. 14.
Figure 19:
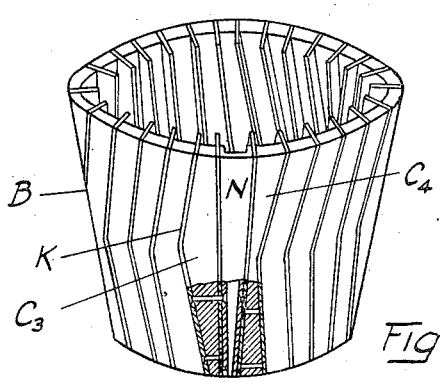
Fig. 19 is an isometric view of a complete unsplit Jordan shell lining such as shown in Figs. 14 and 16 assembled in the manner described herein.

As shown in Figs. 14, 16, 19, the first knife $K^1$ and the last knife $K^9$ can be connected to make a complete 360° lining, by interposing an angular anchor bar or bar N of channel iron construction. Rivets $R^9$ from knives $K^8$ and $K^9$ fasten these knives to web 34 of bar N and rivets $R^5$ fasten web 35 of bar N to knife $K^1$.

In assembling, these rivets $R^5$ may be inserted in holes $H^1$ of knife $K^1$ with their heads against the first separator $W^1$. Channel 36 between webs 34 and 35 allows the connecting rivets to be headed.

Such a filling must be accurately made to fit the permanent shell and a split lining may fit it with or without a wedge and a section may mean any part of a circle or truncated cone up to 360°.

We claim:

1. A bodily transportable section of a preassembled filling for a truncated conical Jordan engine shell made up of groups of knives with interposed separators, the outside knives of each group being held together by a plurality of headed rivets, and there being a second set of rivets which pass through one of said knives which knife also forms an outside member of another adjoining group, such second set of rivets passing through the second group and being headed over another outside knife of said second group.

2. A bodily transportable section of a preassembled filling for a truncated conical Jordan engine shell made up of groups of two knives with one interposed wooden separator, the knives of each group being held together by a plurality of headed rivets, and there being a second set of rivets which pass through one of said knives which knife also forms a member of another adjoining group, such second set of rivets passing through the second group and being headed over another knife of said second group.

3. A bodily transportable section of a preassembled filling for a truncated conical Jordan engine shell made up of groups of knives with interposed separators, the assembly being held together by two sets of rivets, the rivets in the first set being fixed at one end to one knife and passing through a separator and another knife and being headed at the farther side of such second knife, and another set of rivets being fixed to said second knife and extending through a separator and still another knife at the farther side of which they are headed.

4. A bodily transportable section of a preassembled filling for a truncated conical Jordan engine shell made up of groups of knives with interposed separators, the outside knives of each group being held together by a plurality of rods which hold together the knives and interposed separators, there being a second set of rods which are attached to the outside knife of one group and pass through the knives and interposed separators of an adjoining group and which are so fastened on the outside of the outside knife of such adjoining group that each group of knives and separators is held together and the adjoining groups are held together.

5. A bodily transportable section of a preassembled filling for a truncated conical Jordan engine shell made up of alternate knives and separators, the first knife being attached to the second knife by a group of rods each of which is fastened to the first knife and extends through a hole in the interposed separator and in the second knife and has a head on the outside of the second knife, there being another group of rods each of which is fastened to the second knife and passes through a hole in the interposed separator and a hole in a third knife, each of said rods having a head on the outside of the third knife.

6. A bodily transportable section of a preassembled filling for a truncated conical Jordan engine shell made up of alternate knives and separators, the first knife being attached to the second knife by a group of rods each of which is fastened to the first knife and extends through a hole in one interposed separator and in the second knife and is fastened there, there being another group of rods each of which is fastened to the second knife and passes through a hole in another interposed separator and a hole in a third knife and is fastened there, said last named holes being out of alinement with those first named.

7. A bodily transportable preassembled split filling for a truncated conical Jordan engine shell made up of groups of two knives with one interposed separator, the knives of each group being held together by a plurality of headed rivets, and there being a second set of rivets which pass through one of said knives which knife also forms a member of another adjoining group, such second set of rivets passing through the second group and being headed over another knife of said second group.

8. A bodily transportable section of a pre-assembled filling for a truncated conical Jordan engine shell made up of groups of knives with interposed separators, the outside knives of a group being held together by a plurality of rods which hold together the knives and interposed separators, there being a second set of rods which are attached to a knife of one group and pass through various knives and interposed separators, some of which belong to an adjoining group, such second set of rods being so fastened to the outside knife of such adjoining group that each group of knives and separators is held together, and the adjoining groups are held together.

9. In a filling for a Jordan engine shell, the combination of two knives and a separator between them held together by a rivet having a head and a skirt at one end and a head at the other end.

10. A bodily transportable preassembled split filling for a truncated conical Jordan engine shell made up of groups of two knives with an interposed separator, the outside knives of each group being held together by a plurality of rods which hold together the knives and interposed separator, there being a second set of rods which are attached to the outside knife of one group and pass through an interposed separator of an adjoining group and which are so fastened to the outside knife of such adjoining group that each group of knives and separators is held together and the adjoining groups are held together, there being rods fastened to the first and last knife which pass respectively through a cheek piece and are fastened to a straight strip of metal to form a smooth faced channel for a wedge.

HAROLD D. STUCK.
PHILIP A. DE NAULT.